UNITED STATES PATENT OFFICE.

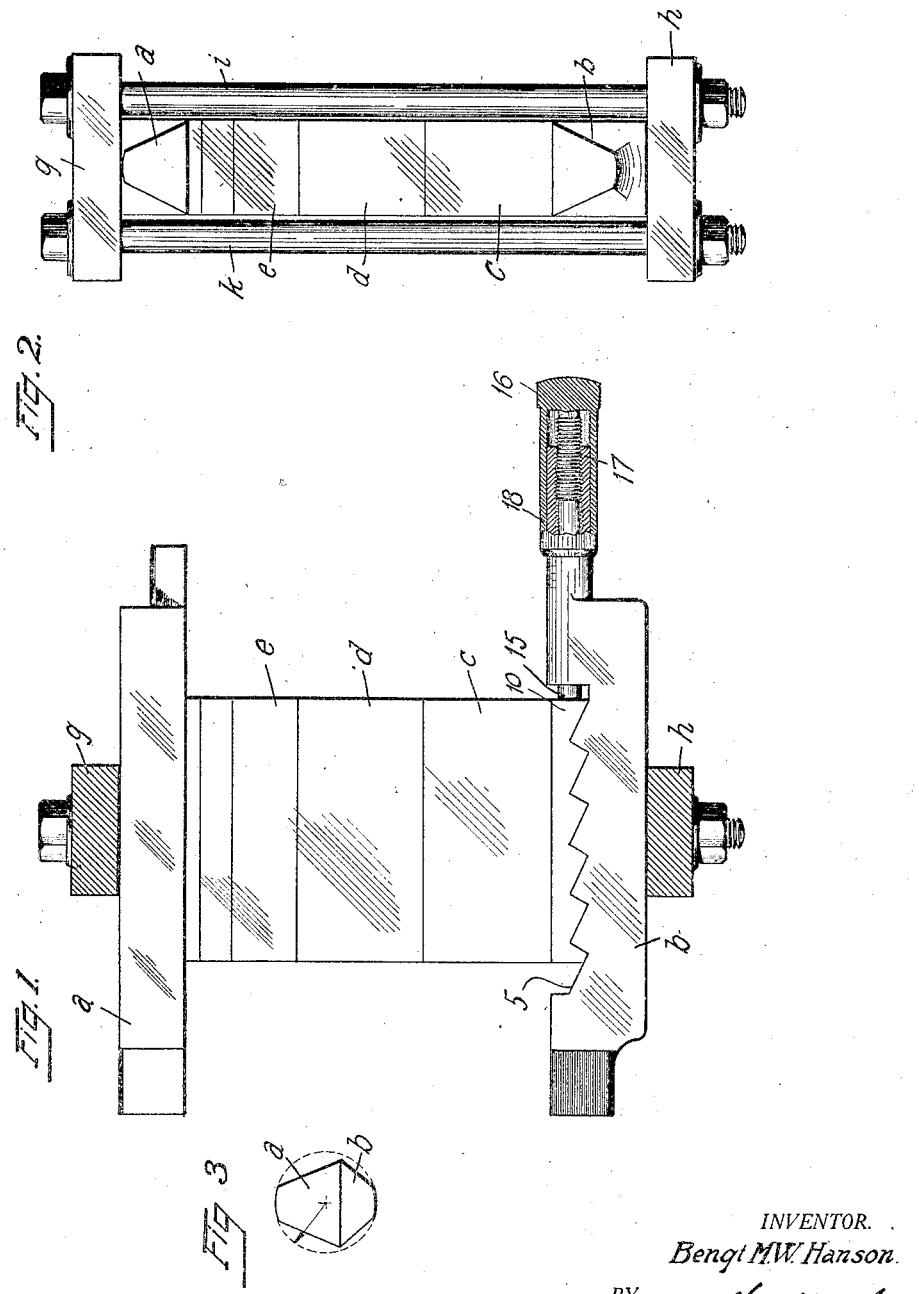

BENGT M. W. HANSON, OF HARTFORD, CONNECTICUT.

GAGE.

1,363,250.      Specification of Letters Patent.      Patented Dec. 28, 1920.

Application filed October 27, 1919. Serial No. 333,493.

*To all whom it may concern:*

Be it known that I, BENGT M. W. HANSON, a citizen of the United States, and a resident of Hartford, county of Hartford, State of Connecticut, have invented certain new and useful Improvements in Gages, of which the following is a specification.

The object of this invention is to produce a gage, either of the outside or inside type, which shall be in the highest degree accurate and which shall also be variable in range within liberal limits. Of course, the prime requisite of a gage is its absolute accuracy. At the same time, there is a large demand for and great utility in a gage so constructed that its capacity may be varied. I am aware that gages of great accuracy and of variable size have heretofore been built but the variation in range or capacity has been accomplished by the use of different combinations of blocks which are interposed between the gage jaws, and in order that such a gage shall be adapted for all measurements within its range it has been necessary to utilize a very large number of blocks of different sizes.

By my invention I have produced a gage which can be made to be extremely accurate, which shall be variable to handle any measurements within its range and one in which the variations may be arrived at with the use of a very few filling blocks between the gage jaws.

Referring to the drawings:

Figure 1 is a side elevation of a gage made in accordance with my invention, parts being shown in section.

Fig. 2 is an end view of the gage.

Fig. 3 is a view of the outer ends of the gage jaws brought together to show the method of generating the shape of the jaws to adapt them for use as an inside gage.

Referring to the drawings, $a$ denotes the upper jaw and $b$ the lower jaw. $c$, $d$, $e$ are the filling blocks positioned between the jaws and by means of which the distance between those faces of the jaws which are used for gaging purposes is accurately fixed. $g$, $h$ are clamping plates for holding the gage parts in assembled position through the medium of the bolts $i$, $k$.

It is obvious that by increasing the number of filling blocks used between the two jaw plates and by a selection of the proper sizes of filling blocks, the spacings between the jaw plates can be varied to suit any requirement. For instance, if a piece an inch and a half in diameter is to be gaged, the proper blocks to space the inner faces of the jaws an inch and a half apart can be interposed and then all may be clamped together. If a hole an inch and a half in diameter is to be gaged, then the thickness of the ends of the jaw plates being known, the proper filling blocks can be interposed to space the outside faces of the jaw plates apart an inch and a half.

Considering a gage which has a range of three inches when used as an outside or snap gage, it has heretofore been necessary to use approximately one hundred and forty-four filling blocks of various sizes in order that the gage jaws could be spaced to take care of the majority of measurements between zero and three inches.

In accordance with this invention, the lower or base jaw member has a series of similarly inclined surfaces formed in it as at 5, the inclination of which may be varied, but for sake of illustration, is indicated as at the ratio of two to one, that is to say, the length of the inclination is twice its height. Fitted into this base is a shoe 10 having on its under side a corresponding formation. Of course, the surfaces of these inclined planes must be very accurately finished. When this shoe is in its lowest position, its upper surface is in exact alinement with the upper surface of the lower jaw $b$. At the end of the lower jaw member, an adjusting mechanism, which may be of general construction of the micrometer, is provided and of which 15 is the plunger having a knurled head 16 and having threaded engagement with a sleeve 17 formed on the jaw $b$ and 18 being the barrel which may be graduated as is usual in a micrometer construction. The end of this plunger 15 presses against the end of the shoe 10.

The maximum elevation which is imparted to the shoe 10 by moving it longitudinally of the jaw $b$ is $\frac{1}{2}$ of an inch. In connection with the two jaws and this sliding shoe, there are utilized five blocks which are of extreme accuracy in measurement and very highly finished. There will be two 1 inch blocks, one $\frac{1}{2}$ inch block, one $\frac{1}{4}$ inch block and one $\frac{1}{8}$ inch block. Since by the micrometer adjustment of the shoe 10 any minute measurement between zero and $\frac{1}{2}$ of an inch can be secured, it will be evident that with a block $\frac{1}{8}$ of an inch in thickness and one ½ inch and one ¼ inch in thickness any measurement between zero and one inch can be secured; that is to say, the adjacent faces of the jaw plates can be spaced apart with the greatest accuracy for any measurement which may be desired between zero and one inch. Then, to increase the range of the gage to two inches, a single one inch block is all that is necessary, and to increase the range of capacity of the gage to three inches another one inch block is needed.

The form and construction of the adjusting mechanism for the shoe 10 is not material since, if the total depth of the jaw $b$ is known, the amount which the shoe is raised above the face of the jaw can be readily determined by an ordinary micrometer. However, it will probably be advantageous to have graduations on the micrometer barrel and use the ordinary micrometer merely for checking purposes when desired. The figures and proportions which have been herein used for purposes of illustration are to be understood as not having any limiting effect, since they may be varied to suit any desired condition.

This gage can be used as an inside gage by properly shaping the ends of the jaws $a$, $b$, and in Fig. 3 is illustrated a preferred method of shaping these jaws which is to give them a general V-shape with a rounded outer surface struck from a center which is one half the distance between the gaging surfaces of smallest range. This is for the purpose of getting a good contact which will not wear readily. The opposite end of the upper jaw $a$ could be cut down to one-half the thickness of the jaw, as clearly indicated in the drawings, so as to bring the range of the gage when used as an inside gage down within smaller limits.

The advantage of this construction is that with a single equipment almost any desired gage can be built up and by the use of the adjustable shoe it is possible to get the full number of variations with the use of a minimum number of blocks. Furthermore, by merely using the adjustable shoe, it is possible to accurately set this gage so that the most minute measurements can be gaged, for the shoe can be adjusted minutely and with accuracy and then by bringing the complementary jaw down and clamping it directly onto the shoe the gage is complete and ready for use. At the same time, the structure is simple, the parts are of such shape that they may be easily manufactured with the greatest degree of accuracy.

I claim as my invention:

1. A gage member comprising a jaw, an adjustable shoe mounted in the jaw, means for moving said shoe longitudinally of the jaw, and means for lifting said shoe during this movement, in combination with a complementary jaw, filling blocks to be positioned between said shoe and complementary jaw, and means for holding said jaws in associated relation.

2. A jaw member of a gage provided with one or more inclined surfaces, a shoe provided on its under side with inclined surfaces corresponding to and adapted to slide upon those of the jaw, means for moving said parts relatively to one another to vary the elevation of said shoe above the face of said jaw, in combination with a complementary jaw, filling blocks to be positioned between said shoe and complementary jaw, and means for holding said jaws in associated relation.

3. A jaw member of a gage provided with one or more inclined surfaces and having an aperture, a shoe provided on its under side with inclined surfaces corresponding to and adapted to slide upon those of the jaw, a hollow sleeve extending laterally from said jaw, a plunger having threaded engagement with that sleeve and with its end extending through an aperture in the jaw into engagement with said shoe, in combination with a complementary jaw, filling blocks to be positioned between said shoe and complementary jaw, and means for holding said jaws in associated relation.

4. A gage comprising a pair of jaws, means for positioning said jaws at varying distances from one another, an adjustable shoe mounted in one jaw and forming a part of said means, and clamps for holding said jaws in associated relation.

5. A gage comprising a pair of coöperating jaws, an adjustable shoe as a part of one jaw, filling blocks to be positioned between the said shoe and the opposite jaw, and clamps to bind the parts of the gage together.

BENGT M. W. HANSON.